(12) United States Patent
Li

(10) Patent No.: US 12,124,136 B2
(45) Date of Patent: Oct. 22, 2024

(54) DISPLAY PANEL AND LIQUID CRYSTAL DISPLAY DEVICE

(71) Applicant: TCL China Star Optoelectronics Technology Co., Ltd., Guangdong (CN)

(72) Inventor: Liang Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/599,577

(22) PCT Filed: Aug. 9, 2021

(86) PCT No.: PCT/CN2021/111473
§ 371 (c)(1),
(2) Date: Sep. 29, 2021

(87) PCT Pub. No.: WO2023/000402
PCT Pub. Date: Jan. 26, 2023

(65) Prior Publication Data
US 2024/0027851 A1 Jan. 25, 2024

(30) Foreign Application Priority Data
Jul. 23, 2021 (CN) .......................... 202110835786.9

(51) Int. Cl.
*G02F 1/1345* (2006.01)
*G02F 1/1333* (2006.01)
*G02F 1/1339* (2006.01)

(52) U.S. Cl.
CPC ...... *G02F 1/1345* (2013.01); *G02F 1/133345* (2013.01); *G02F 1/1339* (2013.01)

(58) Field of Classification Search
None
See application file for complete search history.

(56) References Cited

U.S. PATENT DOCUMENTS

| | | | |
|---|---|---|---|
| 2011/0134352 A1* | 6/2011 | Nakagawa | G02F 1/1345 349/43 |
| 2015/0090966 A1 | 4/2015 | Hyun et al. | |
| 2018/0203554 A1 | 7/2018 | Cho et al. | |
| 2019/0129220 A1* | 5/2019 | Wang | G02F 1/13454 |

FOREIGN PATENT DOCUMENTS

| | | |
|---|---|---|
| CN | 101699335 | 4/2010 |
| CN | 103293736 | 9/2013 |
| CN | 105428371 | 3/2016 |
| CN | 107783342 | 3/2018 |

* cited by examiner

*Primary Examiner* — Thanh Nhan P Nguyen

(57) ABSTRACT

A display panel and a liquid crystal display device are disclosed. The display panel includes a first substrate and a second substrate disposed opposite to each other, a display layer, and a sealant coating area defined in the display panel. Part of the display panel corresponding to the sealant coating area of a first side portion, a second side portion, and a third side portion includes a circuit unit, a first via hole and a second via hole defined on the circuit unit, a first insulating layer disposed in the first via hole, a second insulating layer disposed in the second via hole, a conductive electrode disposed in the first via hole and contacting the circuit unit, and spacers disposed on the first insulating layer and the second insulating layer.

12 Claims, 4 Drawing Sheets

DISPLAY PANEL AND LIQUID CRYSTAL DISPLAY DEVICE

RELATED APPLICATIONS

This application is a National Phase of PCT Patent Application No. PCT/CN2021/111473 having International filing date of Aug. 9, 2021, which claims the benefit of priority of Chinese Patent Application No. 202110835786.9 filed on Jul. 23, 2021. The contents of the above applications are all incorporated by reference as if fully set forth herein in their entirety.

FIELD AND BACKGROUND OF THE INVENTION

The present invention relates to a technical field of displays, and more particularly to a display panel and a liquid crystal display device.

With advancement of technologies, display panels have been widely applied in various fields and commonly used in varieties of electronic products, such as mobile phones, portable multimedia devices, notebook computers, televisions, and monitors. Liquid crystal display panels are mainstreaming display products. Current liquid crystal display panels include thin-film transistor substrates (array substrates), color filter substrates (CF substrates), and liquid crystal materials sandwiched between the array substrates and the CF substrates. The array substrates and the CF substrates are opposed to each other and are assembled into cells by a bonding process with sealants. The thin-film transistor substrates have thin-film transistors and pixel electrodes arranged on substrates, and data is input to pixel electrodes under control of the thin-film transistors, so that deflection of liquid crystals are enabled to display images.

Liquid crystal displays have been developing towards ultra-narrow bezels. In prior art, a seal on busline design is generally used to reduce sizes of frames. However, in the seal on busline design, severe differential pressure is produced because static electricity discharges from electrode layers of upper plates to conductive sealants and electrode layers in via holes of lower plates, and there is no insulating protection above the conductive layers in the via holes of the lower plates, which is prone to damage by overheating or explosion, causing a problem of the failure of the via holes of the electrode layers and uneven brightness, and resulting in abnormal displaying of display panels.

SUMMARY OF THE INVENTION

An object of the present application is to provide a display panel and a liquid crystal display panel to overcome a technical problem that a seal in busline area is prone to overheating or explosion due to static electricity, resulting in uneven brightness of the display panel and unnormal displaying.

To achieve the above-mentioned object, the present application provides a technical solution as follows:

An embodiment of the present application provides a display panel, comprising a display area and a peripheral area disposed adjacent to the display area, the peripheral area configured with a first side portion, a second side portion, and a third side portion, wherein the display panel comprises a first substrate and a second substrate disposed opposite to each other; a sealant coating area defined at least on a first side portion of the peripheral area and provided with a sealant; a display layer disposed between the first substrate and the second substrate, wherein part of the display panel corresponding to the sealant coating area of the first side portion comprises a circuit unit disposed on the first substrate; a first via hole defined on the circuit unit; a conductive electrode disposed in the first via hole and contacting the circuit unit; and a first insulating layer disposed in the first via hole and located between the second substrate and the conductive electrode and covering the conductive electrode and the circuit unit.

Optionally, the circuit unit comprises a first metal layer and a second metal layer spaced apart from the first metal layer, wherein the first metal layer is connected to the second metal layer through the conductive electrode disposed in the first via hole.

Optionally, the circuit unit extends to the second side portion and the third side portion in the peripheral area, and the sealant coating area is further provided on the second side portion and the second side portion, wherein part of the display panel corresponding to the sealant coating area of the second side portion and the third side portion comprises a plurality of second via holes and a second insulating layer disposed in the second via holes, wherein the first metal layer is disposed in the second via holes.

Optionally, a height of the second insulating layer is the same as a height of the first insulating layer.

Optionally, the sealant comprises a plurality of spacers, wherein the spacers are disposed on the first insulating layer and the second insulating layer.

Optionally, the display panel further comprises an organic film layer disposed on the first substrate and surrounding the first via hole and the second via hole, wherein an upper surface of each of the first insulating layer and the second insulating layer close to the second substrate is higher than or equal to an upper surface of the organic film layer close to the second substrate.

Optionally, the first insulating layer covers a plurality of the first via holes, and/or the second insulating layer covers a plurality of the second via holes.

Optionally, the second side portion and the third side portion are located on two opposite sides of the peripheral area, respectively, the first side portion is located between the second side portion and the third side portion, and the first insulating layer and the second insulating layer are made of a photoresist material.

Optionally, the first insulating layer completely covers the conductive electrode.

An embodiment of the present application further provides a liquid crystal display device, comprising a backlight module and a display panel, and the backlight module configured to provide a light source for the display panel, wherein the display panel comprises: a display area and a peripheral area disposed adjacent to the display area, the peripheral area configured with a first side portion, a second side portion, and a third side portion; a first substrate and a second substrate disposed opposite to each other; a sealant coating area defined at least on a first side portion of the peripheral area and provided with a sealant; and a display layer disposed between the first substrate and the second substrate, wherein part of the display panel corresponding to the sealant coating area of the first side portion comprises a circuit unit disposed on the first substrate and comprising a first metal layer and a second metal layer spaced apart from the first metal layer; a first via hole defined on the circuit unit; a conductive electrode disposed in the first via hole and contacting the circuit unit, wherein the first metal layer is connected to the second metal layer through the conductive electrode disposed in the first via hole; and a first insulating layer disposed in the first via hole and located between the second substrate and the conductive electrode and completely covering the conductive electrode and the circuit unit.

The present application has advantageous effects as follows: in the display panel and the liquid crystal display device of the embodiments of the present application, by providing the first insulating layer in the first via hole in the sealant coating area of the first side portion, the second side portion, and the third side portion of the display panel to cover the conductive electrode and the first metal layer and the second metal layer located under the conductive electrode, and by providing the second insulating layer in the second via hole to cover the first metal layer corresponding to the second via hole, insulation and protection are provided for the conductive electrode, the first metal layer, and the second metal layer, thereby effectively overcoming a technical problem of overheating or explosion caused by severe differential pressure produced because static electricity discharges from a color filter substrate to a conductive electrode of an array substrate over a sealant, and preventing uneven brightness (mura) from occurring in peripheries of the display panel. Also, a better support effect of the spacers can be achieved by arranging the spacers on the first insulating layer and the second insulating layer, respectively, thereby ensuring product service life and improving display quality.

BRIEF DESCRIPTION OF THE SEVERAL VIEWS OF THE DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED SPECIFIC EMBODIMENTS OF THE INVENTION

Figure 1:
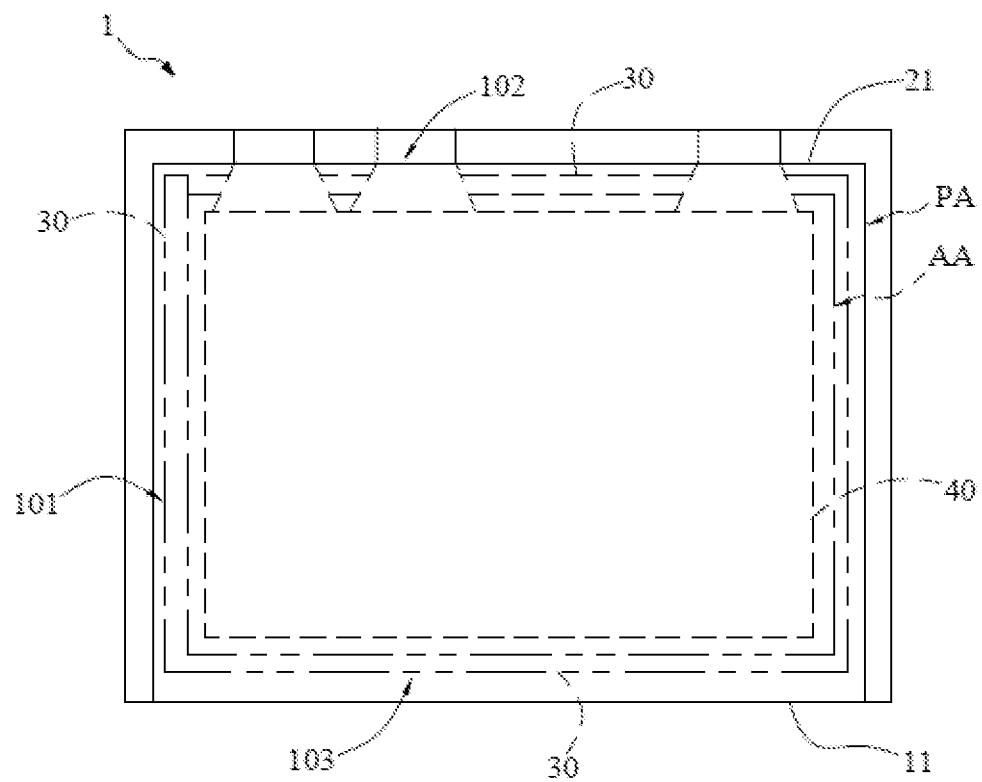
FIG. 1 is a schematic structural plan view of a display panel provided by an embodiment of the present application.

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, units with similar structures are indicated by the same reference numerals. In the drawings, for clear understanding and ease of description, the thickness of some layers and regions are exaggerated. That is, the size and thickness of each component shown in the drawings are arbitrarily shown, but the application is not limited to them.

The present application provides a display panel, particularly a thin-film transistor liquid crystal display panel with a seal in busline circuit, to overcome a problem that a seal in busline area that is prone to overheating or explosion due to static electricity, resulting in uneven brightness of the display panel and unnormal displaying.

Please refer to FIG. 1 of the present application. FIG. 1 is a schematic structural plan view of a display panel provided by an embodiment of the present application. As shown in FIG. 1, the display panel 1 of the present application defines a display area AA (active area) and a peripheral area PA adjacent to the display area AA, and includes a first substrate 11, a second substrate 21 disposed opposite to the first substrate 11, a sealant coating area 30 formed in the peripheral area PA, and a display layer 40 disposed between the first substrate 11 and the second substrate 21. The first substrate 11 and the second substrate 21 may be glass substrates, quartz substrates, or plastic substrates, which are not limited herein. The display layer 40 in this embodiment is a liquid crystal layer and has a plurality of liquid crystal molecules (not shown). In addition, the display area AA of the display panel 1 is an area through which light can pass, thereby displaying images, and the peripheral area PA is mainly an area where peripheral driving components and wirings are arranged. Because of black matrix patterns, the light is difficult to penetrate the peripheral area PA. The peripheral area PA of the embodiment of the present application is arranged around peripheries of the display area AA as an example. Specifically, the peripheral area PA of the embodiment of the present application includes a first side portion 101, a second side portion 102, and a third side portion 103, wherein the second side portion 102 and the third side portion 103 are located at two opposite sides of the peripheral area PA, and the first side portion 101 is located between the second side portion 102 and the third side portion 103.

As described above, the display panel 1 of the embodiment of the present application is a thin-film transistor liquid crystal display panel, and the first substrate 11 includes thin-film transistors (not shown) arranged in an array in the display area AA. According to a working principle of thin-film transistors in the display panel, scan lines located at one side of the display panel transmit scan signals to the thin-film transistors, so that active layers of the thin-film transistors and source electrodes and drain electrodes are connected. Data lines located at the other side of the display panel transmit data signals, so that the thin-film transistors input data to pixel electrodes (not shown) according to the data signals, thereby controlling rotation of liquid crystals in the display layer 40 to display images. In the embodiment of the present application, the first side portion 101 is a gate side of the display panel 1 where a gate circuit is from, and is configured for buslines of the gate circuit. The second side portion 102 is a source side of the display panel 1 where a source circuit is from, and is configured for buslines of the source circuit and driving modules (not shown). The third side portion 103 is a side of the display panel 1 opposite to the source side.

It should be noted that although the display panel in the embodiment of the present application is illustrated by taking the liquid crystal display panel as an example, in other embodiments, the display panel may also be an organic light-emitting diode display panel (not shown), and if so, the display layer may be an organic light-emitting layer. In this case, the second substrate may be a protective cover to protect the organic light-emitting layer from external moisture or objects.

Figure 2:
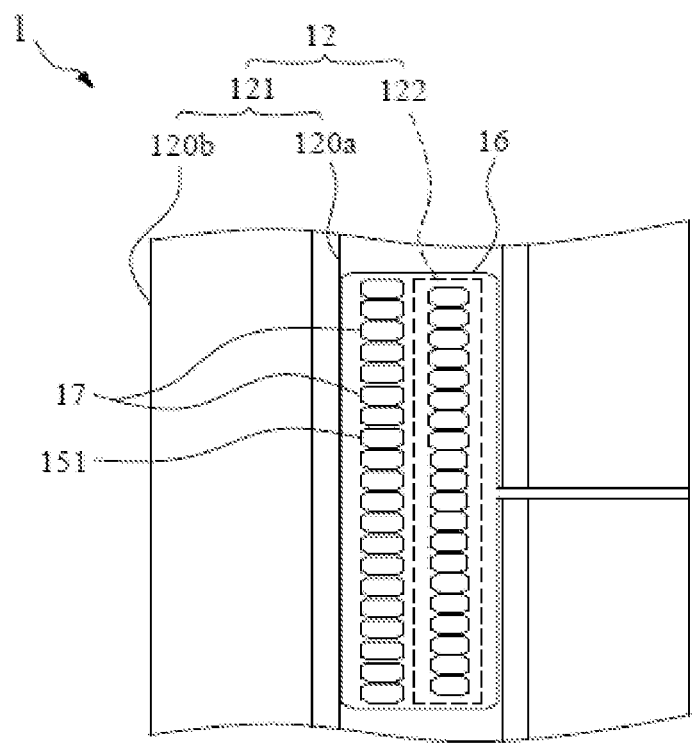
FIG. 2 is a schematic structural plan view of a first side portion in a peripheral area of the display panel shown in FIG. 1.
Figure 3:
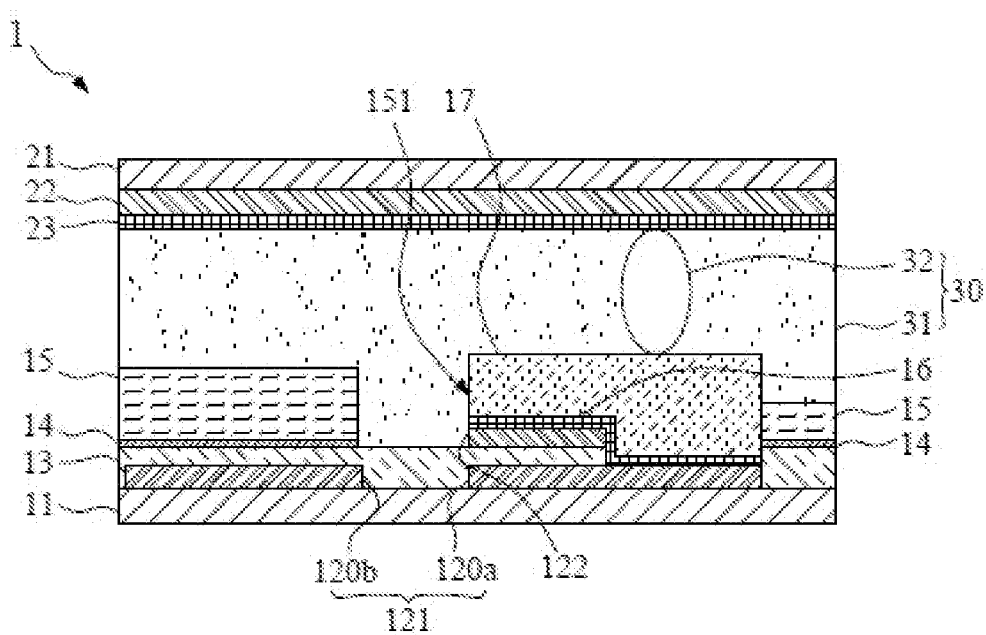
FIG. 3 is a schematic cross-sectional view of the first side portion of the display panel.

Please refer to FIG. 2 in combination with FIG. 1. FIG. 2 is a schematic structural plan view of the first side portion 101 in the peripheral area PA of the display panel shown in FIG. 1. As shown in FIG. 1, the sealant coating area 30 is defined on the first side portion 101 (gate side) of the display panel 1, and a circuit unit 12 is provided in the sealant coating area 30 (as shown in FIG. 2). The circuit unit 12 includes a plurality of signal lines composed of a first metal layer 121 and a second metal layer 122, wherein the first metal layer 121 includes a plurality of signal lines 120a, 120b. Specifically, the display panel 1 of the embodiment of the present application is configured with an array gate driver circuit (GOA), but it is not limited thereto. The GOA circuit is used to reduce a size of a frame, thereby achieving a purpose of a narrow frame design. Due to the use of the GOA circuit, driving components required by the display panel 1 of the embodiment of the present application, for example, driving chips and other components, are mainly arranged on the second side portion 102 (upper side) or the third side portion 103 (lower side) in the peripheral area PA of the display panel 1. A sealant 31 is coated in the sealant coating area 30 (as shown in FIG. 3). The sealant 31 includes a plurality of randomly distributed spacers 32 and conductive balls (not shown), which are provided to seal the circuit unit 12 in the peripheral area PA and to seal peripheries of the first substrate 11 and the second substrate 21, so that the display layer 40 is sealed between the first substrate 11 and the second substrate 21 (as shown in FIG. 1). The spacers 32 may be silicon spacers. Generally, there are many signal lines on the gate side of the GOA circuit, such as frequency signal lines, etc., and the signal lines are electrically connected by conductive electrodes disposed in via holes. In a case that an area is sealed by a sealant, differential pressure is produced because static electricity discharges from a conductive layer of an upper plate of the display panel to the sealant and the conductive electrodes in the via holes of a lower plate (the upper plate is referred to as a color filter substrate, that is, the second substrate 21 and film layer structures disposed on the second substrate 21 in the embodiment of the present application, and the lower plate is referred to as an array substrate, that is, the first substrate 11 and film layer structures disposed on the first substrate 11). However, there is no insulating protection above the conductive electrodes in the via holes, which is prone to damage by overheating or explosion. The display panel of the embodiment of the present application can effectively solve the above-mentioned problem.

Please refer to FIGS. 2 and 3. FIG. 3 is a schematic cross-sectional view of the first side portion 101 of the display panel. As shown in FIG. 3, in the sealant coating area 30 of the first side portion 101, the display panel 1 of the embodiment of the present application includes the first substrate 11, the first metal layer 121, a gate insulating layer 13, the second metal layer 122, a passivation layer 14, and an organic film layer 15 are sequentially arranged from bottom to top. Specifically, the first metal layer 121 is electrically connected to the second metal layer 122 through a conductive electrode 16 in the via hole 151. The organic film layer 15 is formed on the passivation layer 14, and the first via hole 151 is formed through a photolithography process including exposure, development, and etching. A size and position of the first via hole 151 are mainly determined according to the first metal layer 121 and the second metal layer 122. That is, the first via hole 151 is configured to expose the first metal layer 121 and the second metal layer 121 underneath, so that the conductive electrode 16 can be disposed on the first metal layer 121 and the second metal layer 122 in the first via 151 to achieve an electrical connection of the first metal layer 121 and the second metal layer 122. It is particularly noted that in the embodiment of the present application the organic film layer 15 is further provided on the passivation layer 14. The organic film layer 15 may be made of a material such as polyfluoroalkoxy (PFA), which can further change flatness of an underlying film surface to achieve planarization and to prevent mutual interference of electric fields. In another embodiment, the passivation layer can also be replaced by leaving only a PFA film layer.

In the embodiment of the present application, a black light-shielding layer 22 and a conductive layer 23 are sequentially disposed on the second substrate 21 in the sealant coating area 30 in a direction toward the first substrate 11, wherein the black light-shielding layer 22 functions as a black matrix layer for light shielding. A material of the conductive electrode 16 and the conductive layer 23 of the embodiment of the present application is indium tin oxide (ITO), but may also be conductive materials, such as indium zinc oxide (IZO), aluminum zinc oxide (AZO), cadmium tin oxide (CTO), tin oxide (SnO2), or zinc oxide (ZnO), but are not limited thereto.

Continuing referring to FIGS. 2 and 3, the first metal layer 121 in the sealant coating area 30 includes a plurality of signal lines 120a and 120b spaced apart from each other for transmitting common electrode signals. The signal line 120a located corresponding to the first via hole 151, that is, the signal line 120a of the first metal layer 121 located below the conductive electrode 16 and the second metal layer 122, is configured to transmit a common electrode signal of the color filter substrate. The signal line 120b is configured to transmit a common electrode signal of the array substrate (as shown in FIG. 3). The conductive electrode 16 is disposed along the first metal layer 121 and the second metal layer 122, and can completely or partially cover the first metal layer 121 and the second metal layer 122 to electrically connect the second metal layer 122 to the first metal layer 121. As shown in FIG. 3, the second metal layer 122 is connected to the first metal layer 121 through the conductive electrode 16 to transmit or receive signals. It should be noted that, in the embodiment of the present application, a first insulating layer 17 is disposed on the conductive electrode 16 and located corresponding to the first via hole 151. The first insulating layer 17 is made of a photoresist material, such that the first insulating layer 17 is a photoresist, which can be patterned by a photolithography process including exposure, development, etching, etc. The first insulating layer 17 in the embodiment of the present application is configured to provide insulation and protection for the underneath conductive electrode 16, the first metal layer 121, and the second metal layer 122. Specifically, the first insulating layer 17 completely covers the conductive electrode 16. Optionally, an area covered by the first insulating layer 17 can also be slightly over a periphery of the conductive electrode 16 so as to improve a coverage effect.

Through insulation and protection provided by the first insulating layer 17 for the underneath conductive electrode 16, the first metal layer 121, and the second metal layer 122, static electricity discharging from the conductive layer 23 of the second substrate 21 of the display panel 1 to the sealant 31 and the conductive electrode 16 in the via hole 151 of the first substrate 11 will not cause severe differential pressure, thereby preventing overheating or explosion. It should be noted that since the common electrode signal from the color filter substrate is transmitted to the signal line 120a, it is only necessary to provide the first insulating layer 17 above the corresponding signal line 120a, and there is no need to form the first via hole 17 above the corresponding signal line 120b.

In addition, by disposing the first insulating layer 17, a distance between the spacers 32 in the sealant 31 and the second substrate 21 can be reduced due to the support of the first insulating layer 17 for the spacers 32 (as shown in FIG. 3), thereby achieving a better supporting effect in terms of the spacers 32, and effectively overcoming a disadvantage that effects brought about by conventional spacers cannot be exerted due to a larger spacing between the spacers and the second substrate in current via hole configurations. Specifically, in the embodiment of the present application, an upper surface of the first insulating layer 17 close to the second substrate 21 is higher than or equal to an upper surface of the organic film layer 15 close to the second substrate 21, so that a distance between the first insulating layer 17 and the second substrate 21 is reduced, thereby providing better insulation and protection for the conductive electrode 16, the first metal layer 121, and the second metal layer 122.

Figure 4:
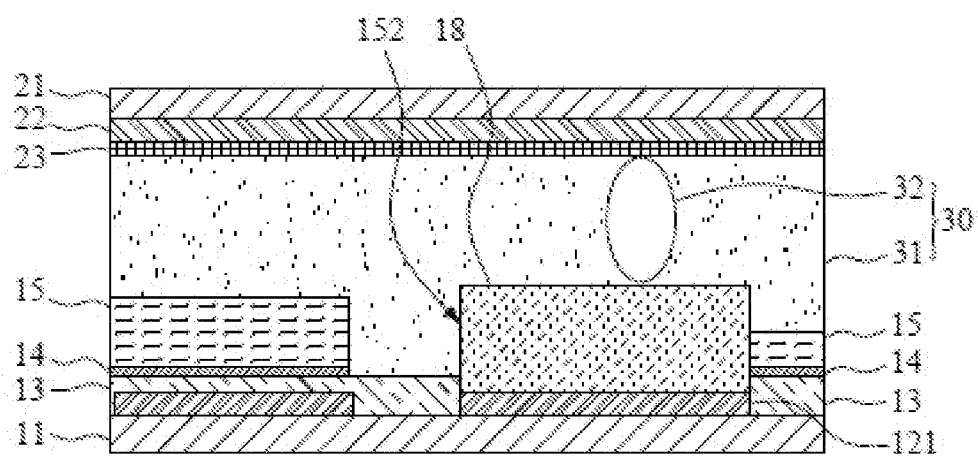
FIG. 4 is a schematic cross-sectional view of a second side portion and a third side portion in the peripheral area of the display panel.
Figure 5:
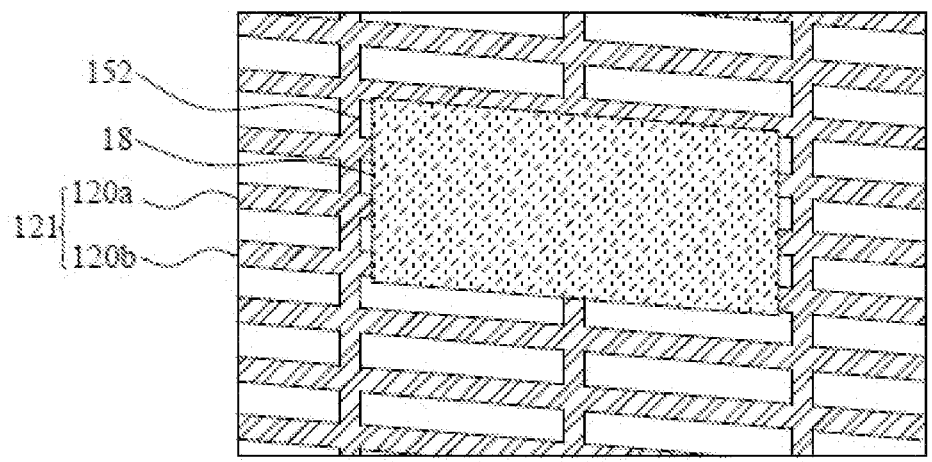
FIG. 5 is a schematic structural plan view of the second side portion of the display panel.
Figure 6:
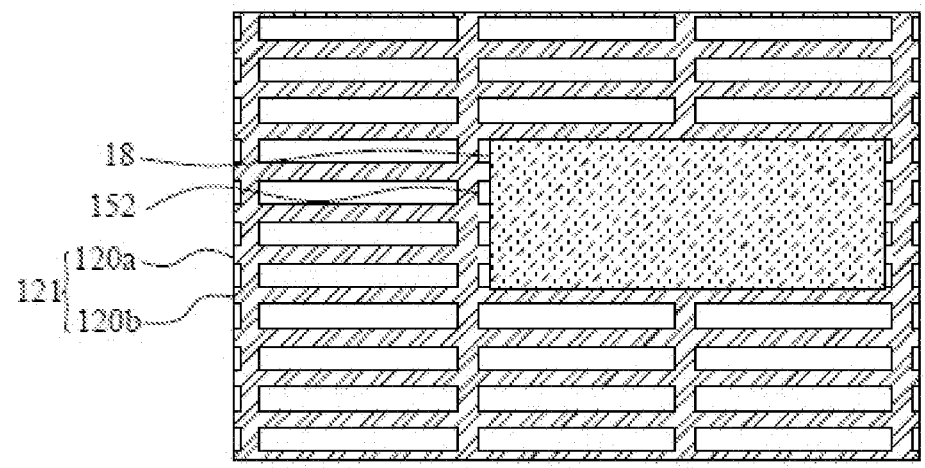
FIG. 6 is a schematic structural plan view of the third side portion of the display panel.

Please refer to FIGS. 4, 5, and 6. FIG. 4 is a schematic cross-sectional view of the second side portion 102 and the third side portion 103 in the peripheral area PA of the display panel 1. FIG. 5 is a schematic structural plan view of the second side portion 102 of the display panel 1. FIG. 6 is a schematic structural plan view of the third side portion 103 of the display panel 1. The sealant coating area 30 of the embodiment of the present application is further defined on the second side portion 102 and the third side portion 103 in the peripheral area PA (as shown in FIG. 1), and the circuit unit 12 extends to the second side portion 102 and the third side portion 103. Since the second side portion 102 is the source side and the first side portion 101 is the gate side, wiring structures are different in these two portions. The display panel 1 of the embodiment of the present application includes a plurality of second via holes 152 and a second insulating layer 18 disposed in the second via holes 152 in the sealant coating area 30 of the second side portion 102 and the third side portion 103. Specifically, the second via holes 152 are formed on the first metal layer 121 corresponding to the second side portion 102 and the third side portion 103, and the second insulating layer 18 is disposed in the second via hole 152 (as shown in FIG. 4), wherein a material of the second insulating layer 18 may be the same as or different from a material of the first insulating layer 17. Preferably, the second insulating layer 18 is made a photoresist material which is a material the same as that of the first insulating layer 17.

Referring to FIG. 4, in the sealant coating area 30 of the second side portion 102 and the third side portion 103, the first substrate 11 is provided with the first metal layer 121, the gate insulating layer 13, the passivation layer 14, and the organic film layer 15. It should be noted that in order to ensure display quality of the display panel 1 and to prevent uneven brightness (mura) from occurring, the second via holes 152 are formed in the first metal layer 121 in the second side portion 102 and the third side portion 103, and the second insulating layer 18 is formed in the second via holes 152. Specifically, each of the second via holes 152 is formed by patterning the organic film layer 15, the passivation layer 14, and the gate insulating layer 13 through a photolithography process. That is, the second via 152 extends through the organic film layer 15, the passivation layer 14, and part of the gate insulating layer 13. Specifically, an upper surface of the second insulating layer 18 close to the second substrate 21 is higher than or equal to the upper surface of the organic film layer 15 close to the second substrate 21, so that a distance between the second insulating layer 18 and the second substrate 21 is reduced. In this manner, the spacers 32 in the sealant 31 can have a better supporting effect through the arrangement of the second insulating layer 18, and can provide insulation and protection for the first metal layer 121 below.

Continuing referring to FIGS. 5 and 6, in the second side portion 102 and the third side portion 103, a plurality of the signal lines 120a, 120b of the first metal layer 121 are disposed in one second via hole 152, that is, the second via hole 152 covers the plurality of the signal lines 120a, 120b, and the second insulating layer 18 is provided in the second via hole 152 (as shown in FIGS. 5 and 6). By forming the second insulating layer 18 with a larger area, a process of forming the second via hole 152 and the second insulating layer 18 can be simplified so as to achieve a purpose of reducing manufacturing cost. As shown in FIG. 5, wirings of the first metal layer 121 on the second side portion 102 are distributed in a fanout configuration. Therefore, the second insulating layer 18 can be arranged according to patterns of the wirings to ensure that the second insulating layer 18 is located in the second via hole 152.

It should be noted that a height of the upper surface of the second insulating layer 18 is the same as a height of the upper surface of the first insulating layer 17, so that the spacers 32 can be distributed in a same horizontal position, which provides an even support effect, thereby enabling the first metal layer 121 to provide stable signal transmission, and preventing mura from being generated to adversely affect the display quality.

Figure 7:
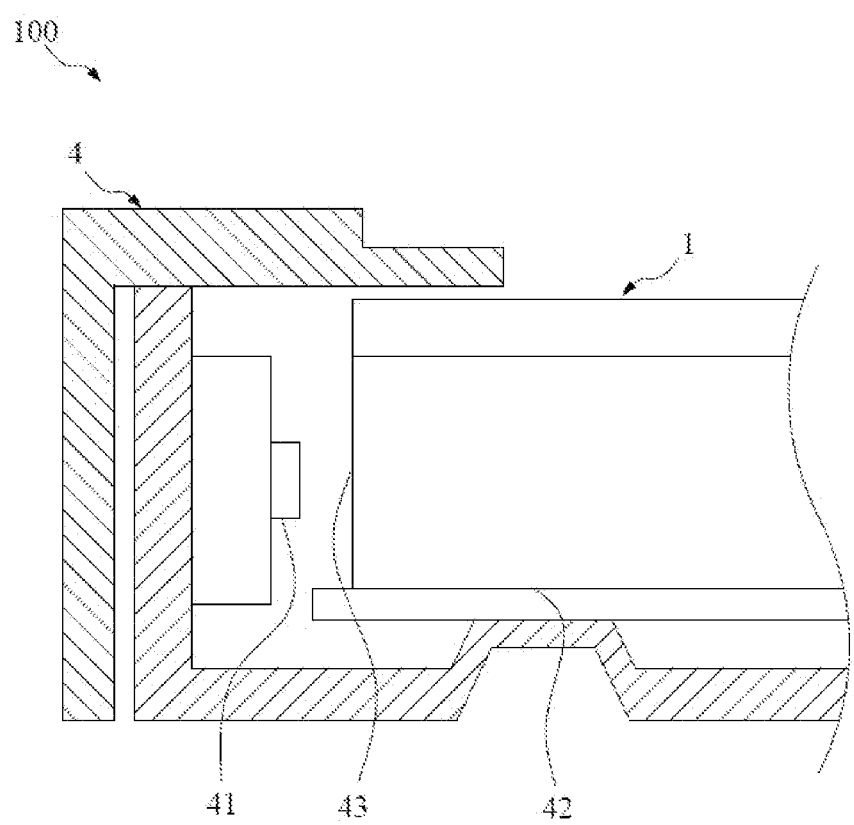
FIG. 7 is a schematic cross-sectional view of a liquid crystal display device provided by an embodiment of the present application.

Please refer to FIG. 7, which is a schematic cross-sectional view of a liquid crystal display device provided by an embodiment of the present application. As shown in FIG. 7, an embodiment of present application further provides a liquid crystal display device 100 including a backlight module 4 and the display panel 1 of the above-mentioned embodiments. The backlight module 4 of the embodiment of the present application is illustrated by taking an edge type backlight as an example and is used to provide a light source required by the display panel 1. The backlight module 4 includes optical elements such as a light-emitting element 41, a reflective sheet 42, and a diffusion plate 43. A detailed structure of the backlight module 4 can be same as a structure of the backlight module of current liquid crystal display devices, and will not be repeated here.

Accordingly, in the display panel and the liquid crystal display device of the embodiments of the present application, by providing the first insulating layer in the first via hole in the sealant coating area of the first side portion, the second side portion, and the third side portion of the display panel to cover the conductive electrode and the first metal layer and the second metal layer located under the conductive electrode, and by providing the second insulating layer in the second via hole to cover the first metal layer corresponding to the second via hole, insulation and protection are provided for the conductive electrode, the first metal layer, and the second metal layer, thereby effectively overcoming a technical problem of overheating or explosion caused by severe differential pressure produced because static electricity discharges from a color filter substrate to a conductive electrode of an array substrate over a sealant, and preventing uneven brightness (mura) from occurring in peripheries of the display panel. Also, a better support effect of the spacers can be achieved by arranging the spacers on the first insulating layer and the second insulating layer, respectively, thereby ensuring product service life and improving display quality.

In the above-mentioned embodiments, the description of each embodiment has its own emphasis. For parts that are not described in detail in an embodiment, reference may be made to related descriptions of other embodiments.

The above describes the embodiments of the present application in detail. The descriptions of the above embodiments are only used to help understand the technical solutions and kernel ideas of the present disclosure; those of ordinary skill in the art should understand that they can still modify the technical solutions described in the foregoing embodiments, whereas these modifications or substitutions do not deviate the essence of the corresponding technical solutions from the scope of the technical solutions of the embodiments of the present disclosure.

What is claimed is:

1. A display panel, having a display area and a peripheral area disposed adjacent to the display area, the peripheral area comprising a first side portion, a second side portion, and a third side portion,
wherein the display panel comprises:
a first substrate and a second substrate disposed opposite to each other;
a sealant coating area defined on the first side portion, the second side portion and the third side portion, and provided with a sealant; and
a display layer disposed between the first substrate and the second substrate,
wherein part of the display panel corresponding to part of the sealant coating area on the first side portion comprises:
a line unit disposed on the first substrate;
a first via hole defined on the line unit;
a conductive electrode disposed in the first via hole and contacting the line unit; and
a first insulating layer disposed in the first via hole and located between the second substrate and the conductive electrode, the first insulating layer covering the conductive electrode and the line unit,
wherein the line unit comprises a first metal layer and a second metal layer spaced apart from the first metal layer, and the first metal layer is connected to the second metal layer through the conductive electrode; and
the line unit extends to the second side portion and the third side portion, and part of the display panel corresponding to parts of the sealant coating area respectively on the second side portion and the third side portion comprises a plurality of second via holes defined on the first metal layer and a second insulating layer disposed in the second via holes.

2. The display panel of claim 1, wherein a height of the second insulating layer is the same as a height of the first insulating layer.

3. The display panel of claim 1, wherein the sealant comprises a plurality of spacers, wherein the spacers are disposed respectively on the first insulating layer and the second insulating layer.

4. The display panel of claim 1, further comprising an organic film layer disposed on the first substrate and surrounding the first via hole and each of the second via holes, wherein an upper surface of each of the first insulating layer and the second insulating layer close to the second substrate is higher than or flush with an upper surface of the organic film layer close to the second substrate.

5. The display panel of claim 1, wherein the first insulating layer covers the first via hole, and/or the second insulating layer covers the second via holes.

6. The display panel of claim 1, wherein the second side portion and the third side portion are located on two opposite sides of the display area, respectively, the first side portion is located between the second side portion and the third side portion, and the first insulating layer and the second insulating layer are made of a photoresist material.

7. The display panel of claim 1, wherein the first insulating layer completely covers the conductive electrode.

8. A liquid crystal display device, comprising a backlight module and a display panel, the backlight module configured to provide a light source for the display panel,
wherein the display panel comprises:
a display area and a peripheral area disposed adjacent to the display area, the peripheral area comprising a first side portion, a second side portion, and a third side portion;
a first substrate and a second substrate disposed opposite to each other;
a sealant coating area defined on the first side portion, the second side portion and the third side portion, and provided with a sealant; and
a display layer disposed between the first substrate and the second substrate,
wherein part of the display panel corresponding to part of the sealant coating area on the first side portion comprises:
a line unit disposed on the first substrate and comprising a first metal layer and a second metal layer spaced apart from the first metal layer;
a first via hole defined on the line unit;
a conductive electrode disposed in the first via hole and contacting the line unit, wherein the first metal layer is connected to the second metal layer through the conductive electrode; and
a first insulating layer disposed in the first via hole and located between the second substrate and the conductive electrode, the first insulating layer completely covering the conductive electrode and the line unit,
wherein the line unit extends to the second side portion and the third side portion, and part of the display panel corresponding to parts of the sealant coating area respectively on the second side portion and the third side portion comprises a plurality of second via holes defined on the first metal layer and a second insulating layer disposed in the second via holes.

9. The liquid crystal display device of claim 8, wherein a height of the second insulating layer is the same as a height of the first insulating layer.

10. The liquid crystal display device of claim 8, wherein the display panel further comprises an organic film layer disposed on the first substrate and surrounding the first via hole and each of the second via holes, and an upper surface of each of the first insulating layer and the second insulating layer close to the second substrate is higher than or flush with an upper surface of the organic film layer close to the second substrate.

11. The liquid crystal display device of claim 8, wherein the first insulating layer covers the first via hole, and/or the second insulating layer covers the second via holes.

12. The liquid crystal display device of claim 8, wherein the second side portion and the third side portion are located on two opposite sides of the display area, respectively, the first side portion is located between the second side portion and the third side portion, and the first insulating layer and the second insulating layer are made of a photoresist material.

\* \* \* \* \*